United States Patent [19]
Takayama

[11] Patent Number: 5,835,291
[45] Date of Patent: Nov. 10, 1998

[54] OUTSIDE MIRROR APPARATUS FOR COUPLED VEHICLE

[76] Inventor: Hidenori Takayama, 3852, Ohaza-osaki, Sakae-machi, Minamikanbara-gun, Niigata-ken, Japan

[21] Appl. No.: 866,339

[22] Filed: May 30, 1997

Related U.S. Application Data

[63] Continuation-in-part of Ser. No. 666,848, Jun. 19, 1996, abandoned.

[30] Foreign Application Priority Data

Jul. 14, 1996 [JP] Japan .................................. 7-178676
Sep. 10, 1996 [JP] Japan .................................. 8-239270

[51] Int. Cl.⁶ .............................. G02B 5/08; G02B 7/18; G02B 7/182
[52] U.S. Cl. ........................ 359/843; 359/872; 359/877
[58] Field of Search ................................. 359/841, 843, 359/872, 881, 877; 248/480

[56] References Cited

U.S. PATENT DOCUMENTS

| | | | |
|---|---|---|---|
| 2,241,866 | 5/1941 | Needham | 359/841 |
| 3,390,937 | 7/1968 | Nicholson | 359/850 |
| 3,469,901 | 9/1969 | Cook et al. | |
| 3,610,736 | 10/1971 | Bateman | 359/877 |
| 3,830,561 | 8/1974 | La Fave et al. | 359/877 |
| 3,937,563 | 2/1976 | Frabe | 359/841 |
| 4,558,930 | 12/1985 | DeeDreek | 359/841 |
| 4,758,078 | 7/1988 | Bracamonte | 359/841 |
| 4,856,888 | 8/1989 | Wahl | 359/881 |
| 4,911,545 | 3/1990 | Miller | 359/841 |
| 5,056,905 | 10/1991 | Jensen | 359/843 |
| 5,085,504 | 2/1992 | Jensen | 359/843 |
| 5,684,647 | 11/1997 | Rouleau | 359/843 |
| 5,719,713 | 2/1998 | Brown | 359/843 |

FOREIGN PATENT DOCUMENTS 52-116240 of 0000 Japan .
64-42949 3/1989 Japan .

*Primary Examiner*—Ricky D. Shafer
*Assistant Examiner*—Mark A. Robinson
*Attorney, Agent, or Firm*—Quarles & Brady

[57] ABSTRACT

An outside mirror apparatus for a coupled vehicle for improved visual confirmation of the positional relationship between the back of a coupled vehicle and the surroundings thereof. An object 9 to be detected is mounted to a frame 4F of a trailer 4 adjacent a pivotable coupling 5. A plurality of proximity sensors 8,8A,8B . . . are disposed at preset angular intervals in a frame 3F of a tractor 3 adjacent the pivotable coupling 5. These sensors 8,8A,8B . . . are arranged to correspond to the rotational orbit of the object 9. The object 9 is detected by each proximity sensor, thereby detecting an angle of bend "theta" between the tractor 3 and the trailer 4. Based on the detected result, the direction of a mirror surface 33A is able to be properly controlled.

4 Claims, 15 Drawing Sheets

OUTSIDE MIRROR APPARATUS FOR COUPLED VEHICLE

CROSS REFERENCE TO RELATED APPLICATIONS

This application is a continuation-in-part application of U.S. Ser. No. 08/666,848 filed on Jun. 19, 1996, now abandoned.

BACKGROUND OF THE INVENTION (a) Field of the Invention

The present invention relates to an outside mirror apparatus for a coupled vehicle, such as a truck/trailer.

(b) Description of Prior Art

Conventionally, there has been proposed an outside mirror which can rotate a mirror to insure the seeing of rearview when a coupled vehicle turns around a corner, for example, in Japanese Utility Model Application Laid-Open No. 64-42949. The conventional outside mirror comprises a circuit board including: a mirror angle operation circuit into which wheel base data for determining an angle of an outside mirror can be input to obtain a proper indirect rear view based on detection signals from a sensor for detecting an angle of bend between a tractor and a trailer; a mirror driving circuit for control of the angle of mirror based on the operated result; a detection circuit for detecting a position of the mirror and feed-backing to said operation circuit. Said sensor is consructed by a potentiometer mounted onto a tractor frame, having a lever pivotably mounted thereon, said lever having one end connected through a ball joint to one end of a rod, of which the other end is connected through a ball joint to a bracket secured to a trailer, whereby said sensor can detect a rotated angle of the lever due to the relative displacement between said tractor frame and the trailer, thereby outputting certain electric signals.

However, according to the conventional outside mirror apparatus, as a trailer was coupled with a tractor by a rod, so that the rod had to be removed every time you replace the trailer, thus resulting in troublesome replacing works. Further, the mounting positions of the sensor would be subjected to many limitations. In addition, up-and-down movement of a coupled vehicle caused by its travel would be liable to have the rod twisted or apply undurable force to the ball joint, so that it would indicate inferior durability in general.

Furthermore, with the conventional apparatus, there would be certain cases in which a driver could not obtain sufficient rearview by mere adjustment of the positions of the mirror at a predetermined position, particularly when a trailer having a greater width than that of a tractor is coupled with the tractor. In addition, as the conventional outside mirror apparatus would allow the angle of the mirror surface to be continuously changed in association with the change of the angle of bend between the tractor and the trailer, there has been another problem such that a driver would find it difficult to confirm the change of the direction of the back part of the trailer due to such continuously moving outside mirror.

SUMMARY OF THE INVENTION

To eliminate the above-mentioned problems, it is, therefore, a main object of the present invention to provide an outside mirror apparatus for a coupled vehicle which can allow a driver to obtain a better rear view and confirm the positional relationship between the back of the vehicle and the surroundings thereof when the coupled vehicle turns around.

It is another object of the present invention to provide an outside mirror apparatus for a coupled vehicle which can detect an angle of bend with simplified works after a trailer is replaced.

It is also an object of the present invention to provide an outside mirror apparatus for a coupled vehicle which has a simplified structure and yet excellent durability.

According to a major feature of the present invention, there is provided an outside mirror apparatus for a coupled vehicle comprising: an outside mirror mounted to said tractor, said outside mirror having a mirror body; a mirror rotating means for rotating said outside mirror around a veritcal axis thereof; an angle detector means for detecting an angle of bend between said tractor and said trailer; a mirror angle controller means for controlling an angle of said mirror based on the angle of bend detected by said angle detector means so that a proper rearview can be obtained, wherein said angle detector means comprises a plurality of proximity sensors provided in said tractor, said sensors being capable of detecting a rotation of said trailer around a pivotable coupling.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which:

FIG. 12 generally indicates a section showing an outside mirror apparatus of a second embodiment of the invention, of which

DETAILED DESCRIPTION OF THE PREFERRED EMBODIMENTS

Figure 1:
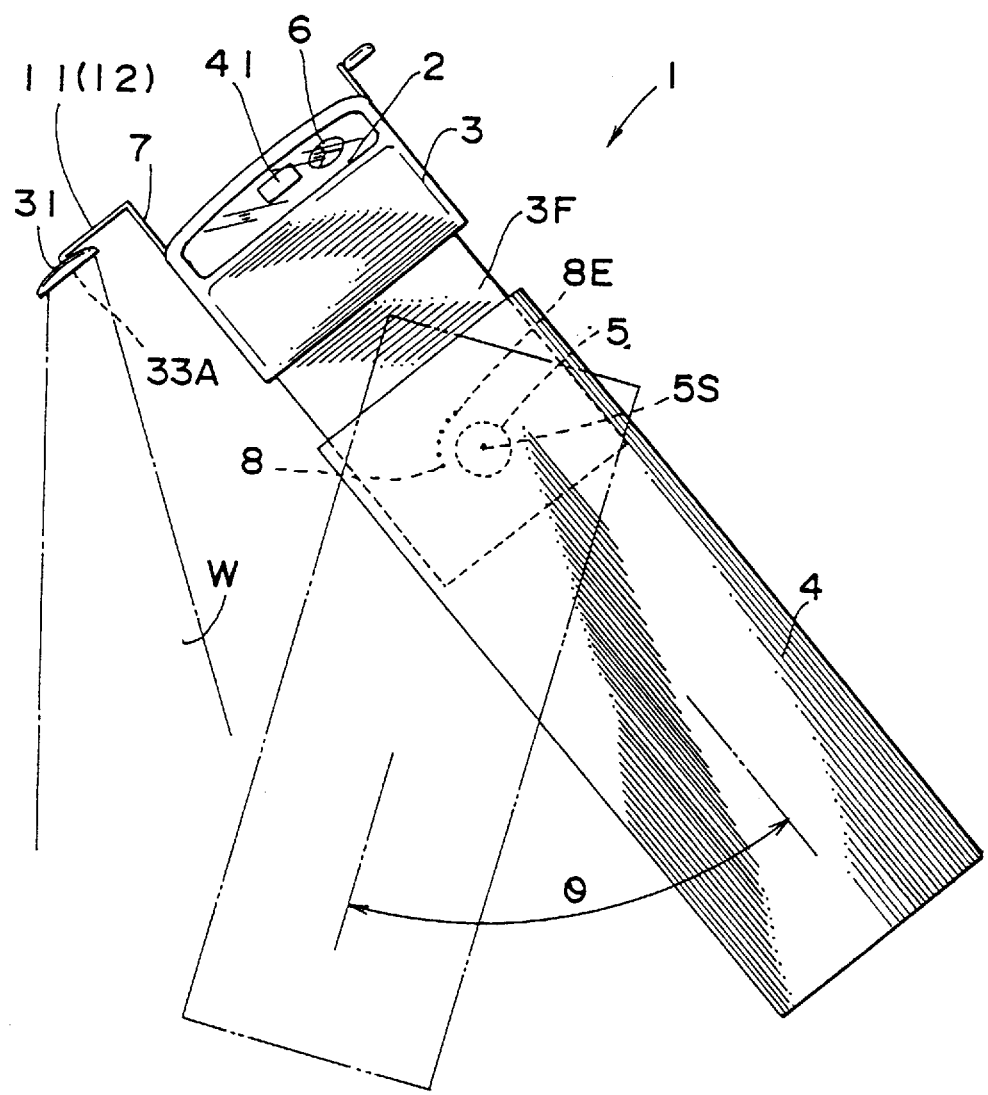
FIG. 1 is a plan view showing a coupled vehicle having an outside mirror apparatus of a first embodiment of the invention.

Hereinafter are described embodiments of an outside mirror apparatus for a coupled vehicle of the invention with reference to the attached drawings.

In FIGS. 1 to 11 showing a first embodiment of the invention, reference numeral 1 designates a tractor/trailer as a coupled vehicle which comprises a tractor 3 having a driving seat 2 and a trailer 4. The tractor 3 has an engine (not shown) mounted thereon, and is connected to the trailer 4 at the back thereof via a pivotable coupling 5. In this example, at the right side of the tractor 3 is provided a handle 6 as well as the driving seat 2, while at the other side thereof, i.e, the left side thereof is provided a stay extending from back to front.

Figure 2:
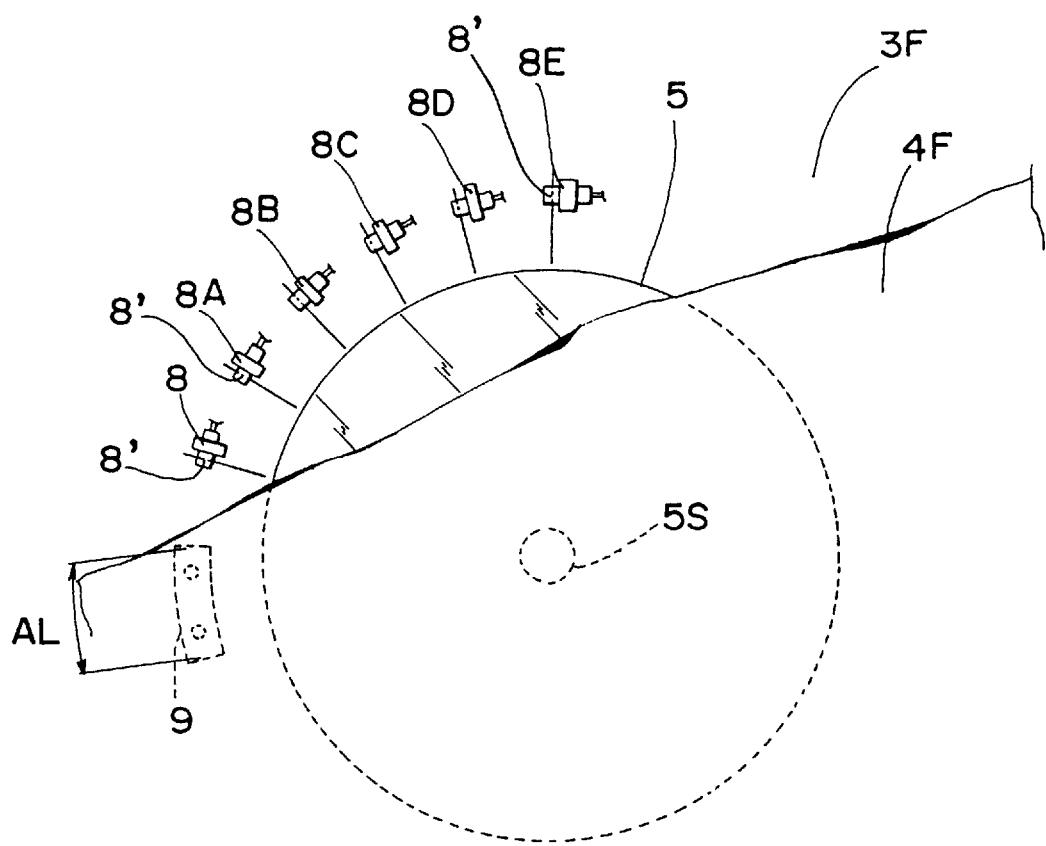
FIG. 2 is a partially cutaway plan view showing a pivotable coupling of an outside mirror apparatus of a first embodiment of the invention.
Figure 3:
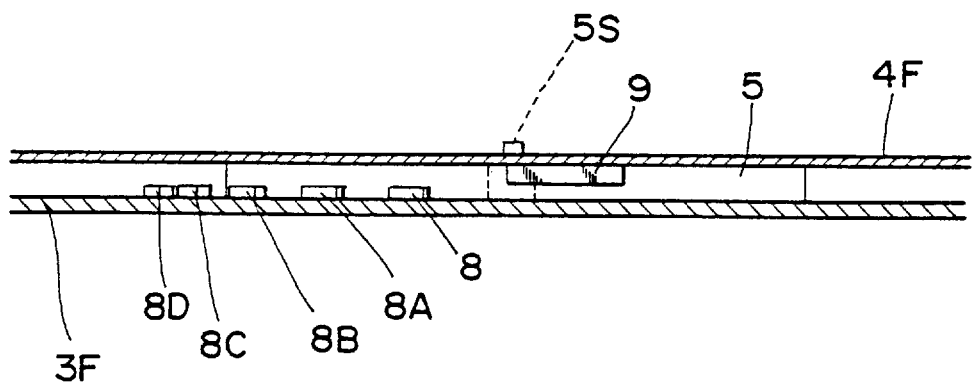
FIG. 3 is a section showing a surroundings of the pivotable coupling of a first embodiment of the invention.
Figure 4:
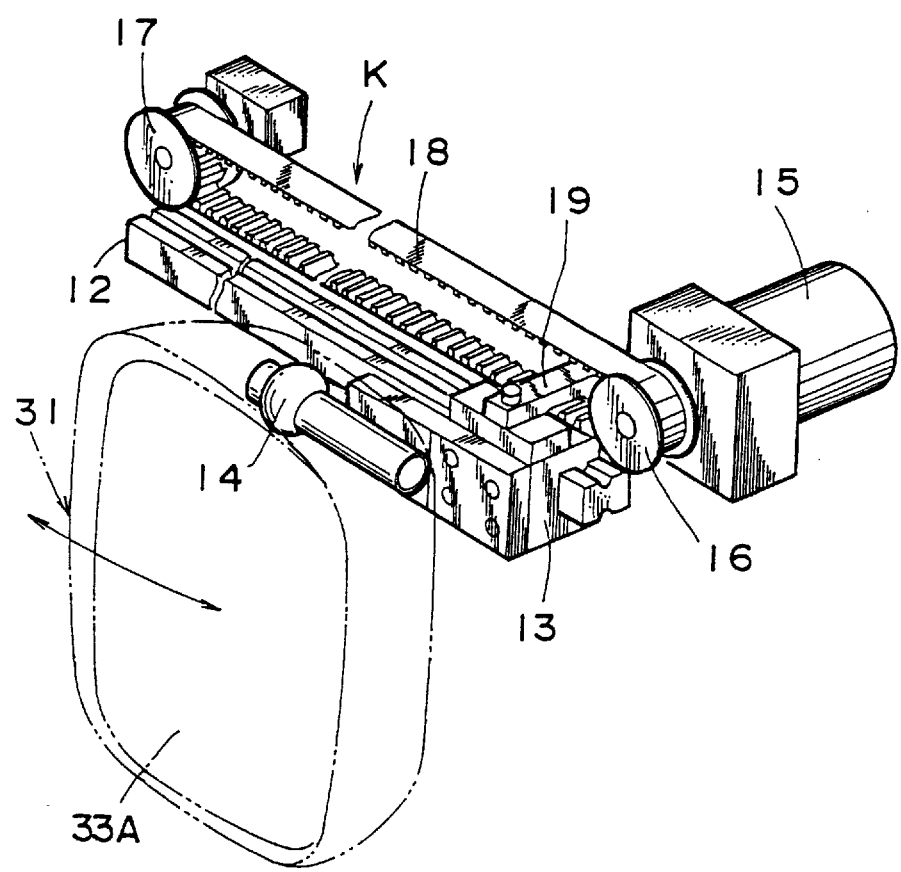
FIG. 4 is a perspective view showing a main part of an outside mirror apparatus of a first embodiment of the invention.
Figure 5:
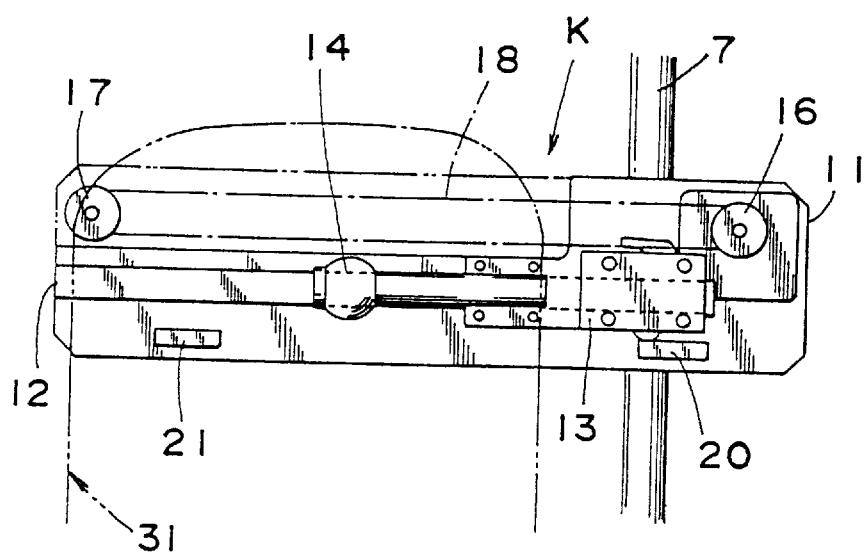
FIG. 5 is a front view showing a main part of an outside mirror apparatus of a first embodiment of the invention.

Said tractor 3 and trailer 4 are coupled in the manner of capable of disengaging from each other by said pivotable coupling 5, Around a pivoting center 5S of said pivotable coupling 5, and also on an upper surface of a frame 3F of said tractor 3 are disposed a plurality of proximity sensors 8,8A,8B,8C,8D and 8E at preset anglular intervals respecively, each angular interval being defined by each arc interval between the adjacent sensing points 8', which is 15 degrees in this embodiment. From a lower surface of a frame 4F of said trailer 4 protrudes a metallic dog 9 which is to be detected by said proximity sensors 8,8A,8B,8C,8D and 8E. The dog 9 is located, as illustrated in FIG. 2, at an angle of 15 degrees relative to the most proximal proximity sensor 8 when said tractor 3 is aligned with said trailer 4, said dog 9 having an arc length AL corresponding to each arc interval between the adjacent sensors. These proximity sensors 8,8A, 8B,8C,8D and 8E are sensors that can perform non-contact switching operation, which may be a high frequency oscillation type, capacitance type, magnetic type or photoelectric type, but more preferably, either a high frequency oscillation type or capacitance type.

For example, in the case of high frequency oscillation type proximity sensor, it takes advantage of the change of inductance of a detector coil followed by an induction current flowing therein when a metallic object (which is, in this example, dog 9) approaches the detector coil, to which is connected an oscillation circuit thererby performing switching operation based on the changes of its oscillation frequency or oscillation amplitude.

To said stay 7 is fixed one end of a laterally lengthy mounting frame 11, within which is laid a slide guiding rail 12 protruding sidewise from said stay 7 toward its left direction. Further, there is provided a slide block 13 movable along said guiding rail 12, said slide block 13 having a mirror fixture 14 fixed thereto, to which is mounted a hereinbelow-described outside mirror.

Reference numeral 15 designates a motor 15 with reduction gears, constructing a part of a means for shifting a mirror, which is provided at the one side of said mounting frame 11, said motor 15 having a driving pulley 16 mounted to its rotation shaft, and a driven pulley 17 at the opposite side. Between the driving pulley 16 and driven pulley 17 is installed a driving belt 18 having tooth, to which is fixed said slide block 13 by a fixture 19. Further, there is provided a retreated position detector sensor 20 for detection of the retreat position of said outside mirror 31 at one side of said mounting frame 11, while a advanced position detector sensor 21 for detection of the advanced position of said outside mirror 31 at the other side thereof. These sensors 20 and 21 detect the position of said outside mirror 31 based on the position of said slide guiding block 13, said sensors 20 and 21 function to output detection signals to hereinafter-described operating portion 41 and mirror angle controller means 51 respectively. Thus, a shifting mechanism K for said outside mirror 31 is constructed by said slide guiding rail 12, slide block 13, pulleys 16,17 and driving belt 18.

Said outside mirror 31 comprises a hollow cover body 32 having an aperture, a flat mirror body 33 mounted adjacent said aperture in the manner capable of rocking, said mirror body 33 having a mirror surface 33A at its front, and a mirror rotating means 34 provided inside said cover body 32 for rotation of said mirror body 33. The mirror rotating means 34 is to rotate said mirror body 33 sidewise around a virtual vertical axis Kt, and also to rotate the same around a virtual horizontal axis Ky, said vertual axes Kt and Ky meeting at right angles at a center S of said mirror body 33. The mirror rotaing means 34 is provided with a driving motor (not shown) to pull or push a few positions on the back surface of said mirror body 33 while using said center S as a fulcrum, with the use of suitable wire, shaft or gears (not shown), so that both the plane and elevation angles of said mirror surface 33A can be adjusted.

Figure 7:
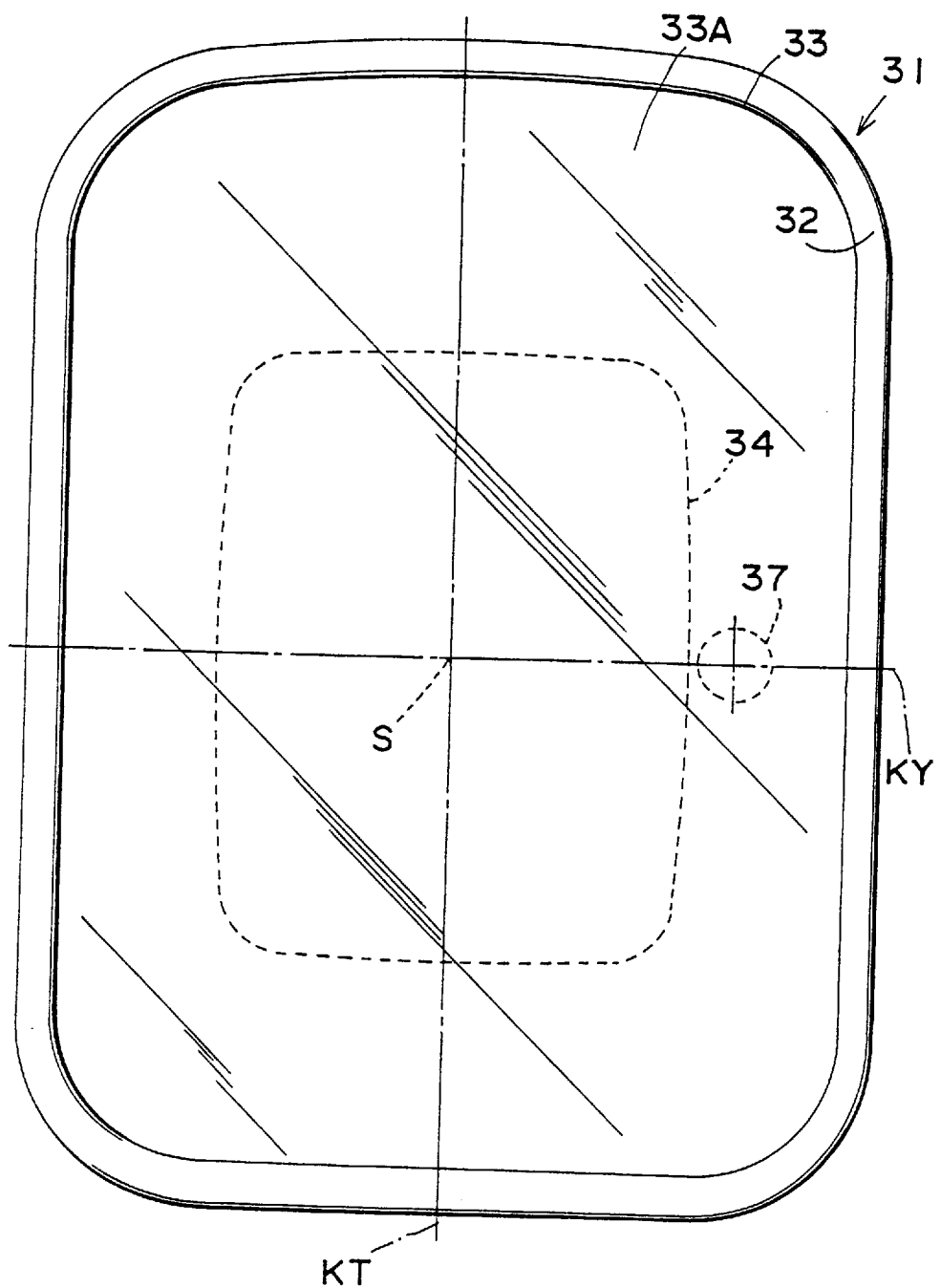
FIG. 7 is a front view showing an outside mirror of a first embodiment of the invention.
Figure 8:
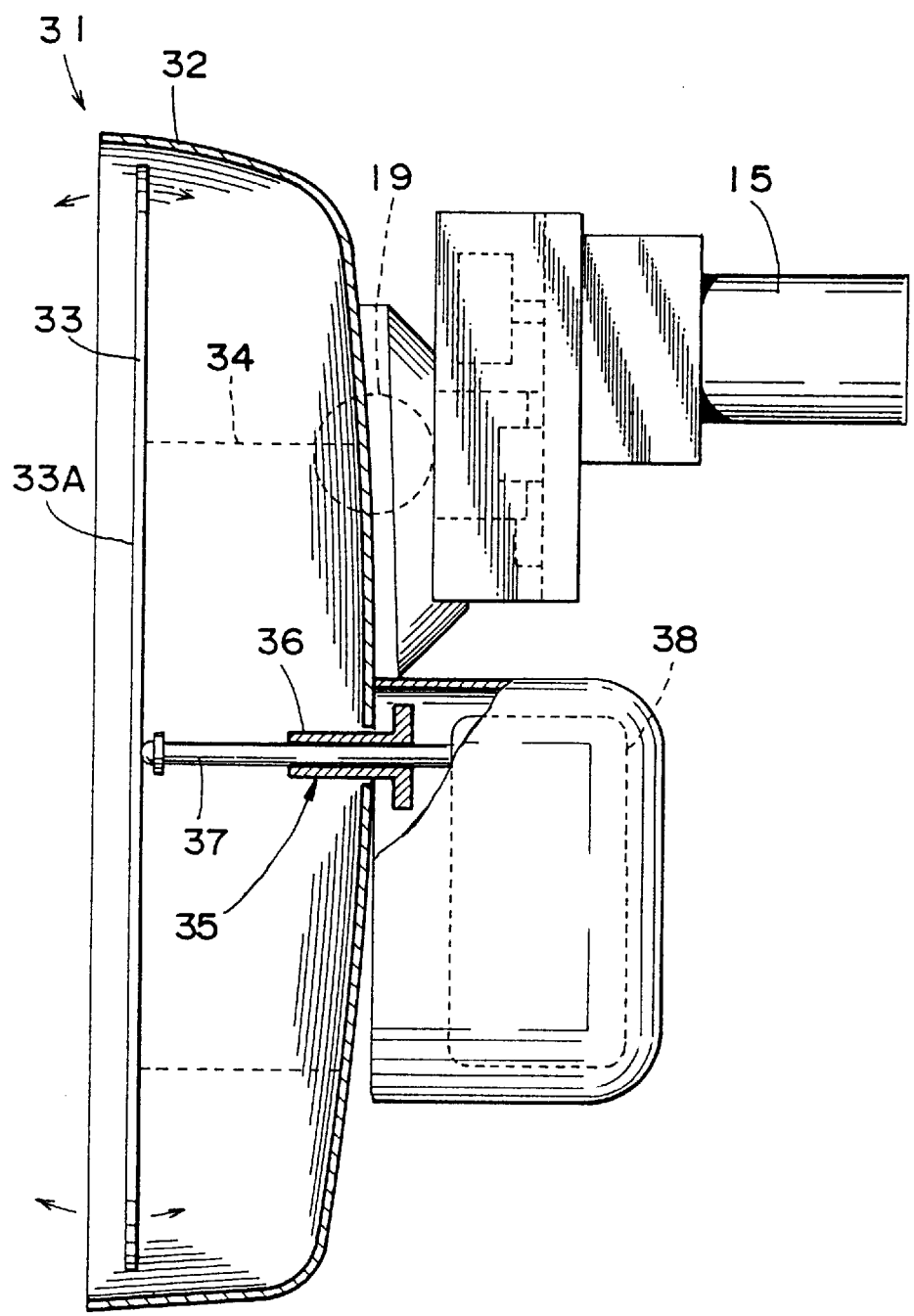
FIG. 8 is a profile showing an outside mirror of a first embodiment of the invention.

Said outside mirror 31 further comprises a mirror angle detector means 35 for detection of a plane angle of said mirror surface 33A, said detector means 35 comprising a guiding inner cylinder 36 extending lengthwise which is provided in said cover body 32, a detector rod 37 movable along said inner cylinder 36 and a potentiometer 38. When a distal end of said detector rod 37 is pressed by a suitable urging means (not shown) against the back surface of said mirror body 33, said potentiometer 38 can detect the position of said detector rod 37 resulting from the sidewise or plane rotation of said mirror body 33. As illustrated in FIG. 7, the distal end of said detector rod 37 abuts upon the back surface of said mirror body 33 with the same meeting said virtual horizontal axis Ky.

Figure 9:
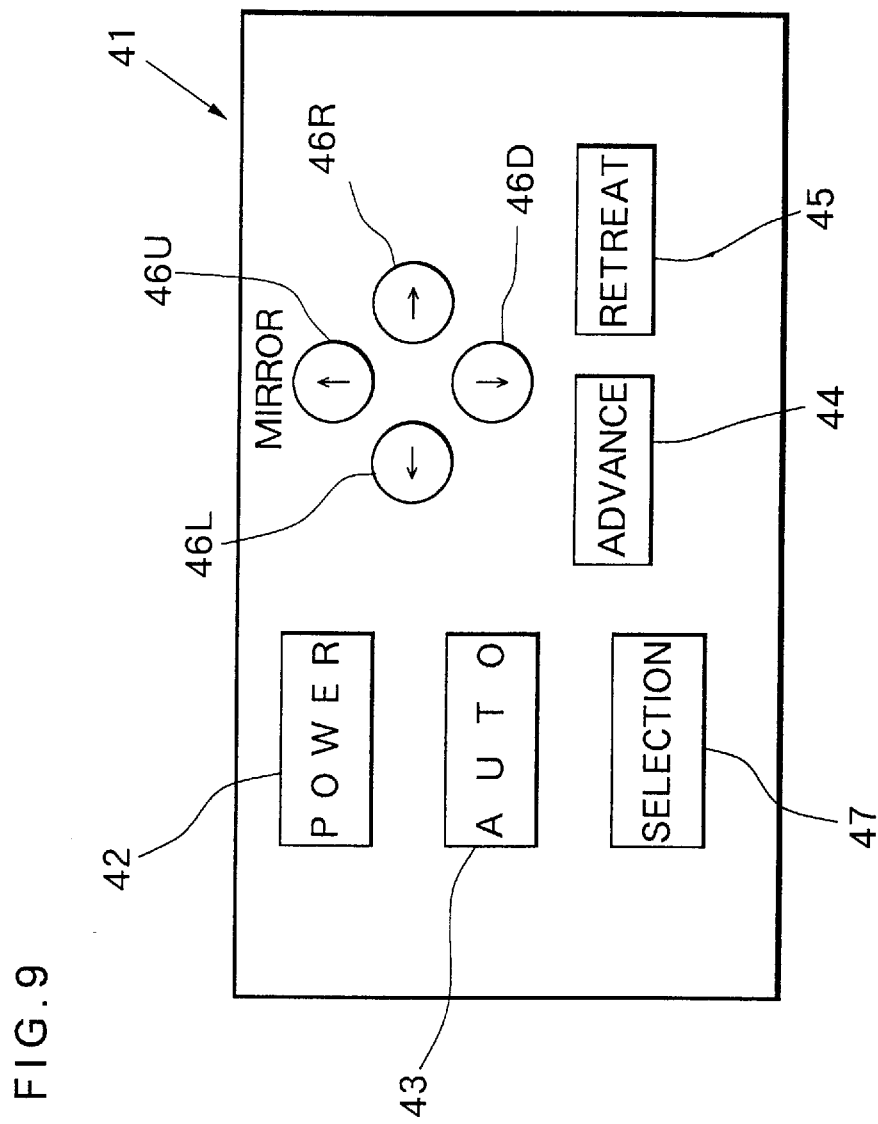
FIG. 9 is a front view showing an operating portion of an outside mirror apparatus of a first embodiment of the invention.
Figure 10:
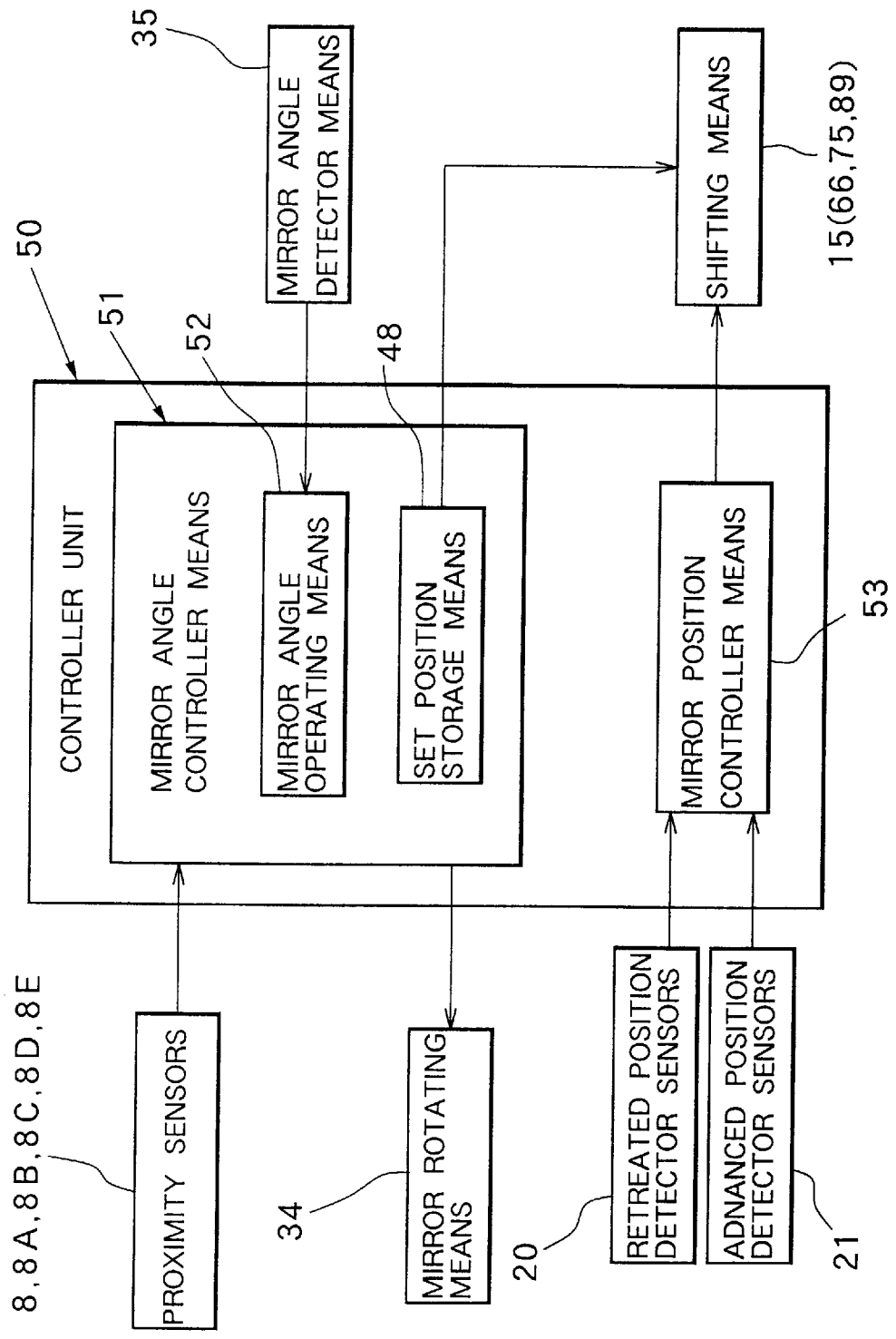
FIG. 10 is a block diagram of a mirror angle controller means of an outside mirror apparatus of a first embodiment of the invention.

In the driving seat 2 is provided the operating portion 41 for said outside mirror 31. The operating portion 41 is, as illustrated in FIG. 9, provided with a power switch 42, an automated mode selection switch 43, an advancing switch 44 for actuating said motor 15 to advance said outside mirror 31, a retreating switch 45 for actuating said motor 15 to retreat said outside mirror 31, four rotating switches consisting of an up-rotating switch 46U, down-rotating switch 46D, left-rotating switch 46L and right-rotating switch 46R for actuating said mirror rotating means 34 to rotate said mirror body 33 up, down or sidewise respectively, and a trailer selection switch 47.

Thus, with said power switch 42 being on while said automated mode selection switch 43 being off, said advancing switch 44, retreating switch 45, up-rotating switch 46U, down-rotating switch 46D, left-rotating switch 46L and right-rotating switch 46R are each suitably operatively adjusted to drive said outside mirror 31. In other words, when the advancing switch 44 is pressed, said motor 15 is actuated to move said outside mirror 31 away from the vehicle, which is followed by the detection of said slide block 13 by said advanced position detector sensor 21, whose detection signal allows a mirror position controller means 53 to stop said motor 15. On the other hand, when the retreating switch 45 is pressed, said motor 15 is actuated to move said outside mirror 31 toward the vehicle, which is followed by the detection of said slide block 13 by said retreated position detector sensor 20, whose detection signal allows said mirror position controller means 53 to stop said motor 15. Alternatively, these advancing or retreating switches 44,45 may continuously actuate said motor 15 as long as they are being pressed, thus enabling said outside mirror 31 to stop in an optional position between said two detection sensors 20 and 21 so that the position of said outside mirror 31 may be suitably adjusted, corresponding to varying width of the trailer 4.

Subsequently, by pressing said up-rotating switch 46U, down-rotating switch 46D, left-rotating switch 46L and right-rotating switch 46R, said mirror rotating means 34 is actuated to continuously rotate said mirror body 33, which is then stopped by releasing said switches, whereby the angle of the mirror surface 33A can be adjusted to a user's line of sight. Reference numeral 48 designates a set position storage means for memorizing thus adjusted set position unique to the user, which is provided in a mirror angle controller means 51 of a controller unit 50.

Figure 6:
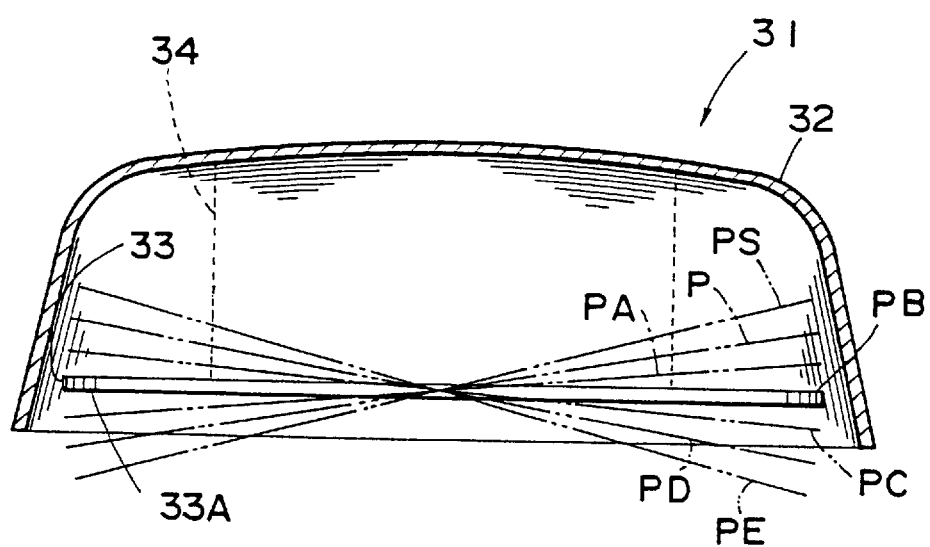
FIG. 6 is a plan section showing an outside mirror of a first embodiment of the invention.

The mirror angle controller means 51 comprises an electric circuit, a computer and the like for control of said mirror rotating means 34 by means of said detection signals from said proximity sensors 8,8A,8B,8C,8D and 8E. Thus, the controller means 51 drives said mirror rotating means 34 based on said detection signals with said automated selection switch 43 being turned on, thereby automatically adjusting the angle of said mirror body 33 so that a driver can see the mirror surface 33A bringing a side range W of the back part of the trailer 4 into his sight, as illustrated in FIG. 1. In this case, the plane angle of said mirror body 33 located at said set position can be adjusted by stages without changing the angle of elevation of said mirror body 33, whereby the detection signals from said proximity sensors 8,8A,8B,8C, 8D and 8E which detected said dog 9, as illustrated in FIG. 6, can allow said mirror body 33 to rotate toward the respective first to seventh directions PS,P,PA,PB,PC,PD and PE, of which the first direction PS applies where no detection signal is input from any of said proximity sensors.

On the other hand, the displacement of said detection rod 37 due to the rotation of said mirror body 33 can be detected by said mirror angle detector means 35, which outputs detection signals so that a mirror angle operating means 52 may operate the angle. of said mirror surface 33A based on the signals, whereby said mirror rotating means 34 is controlled with thus obtained operated value. As a result, said mirror angle controller means 51 can controllably rotate the mirror surface 33A so that the surface 33A may be oriented to one of the said preset directions PS,P,PA,PB,PC,PD and PE.

It should be noted that the mirror angle controller means 51 is adapted to perform the above-mentioned control with the automated mode selection switch 43 being on, while with the switch 43 being off, the set position storage means 48 drives said mirror rotating means 34 to have the mirror surface 33A return to the set position or home position.

Figure 11:
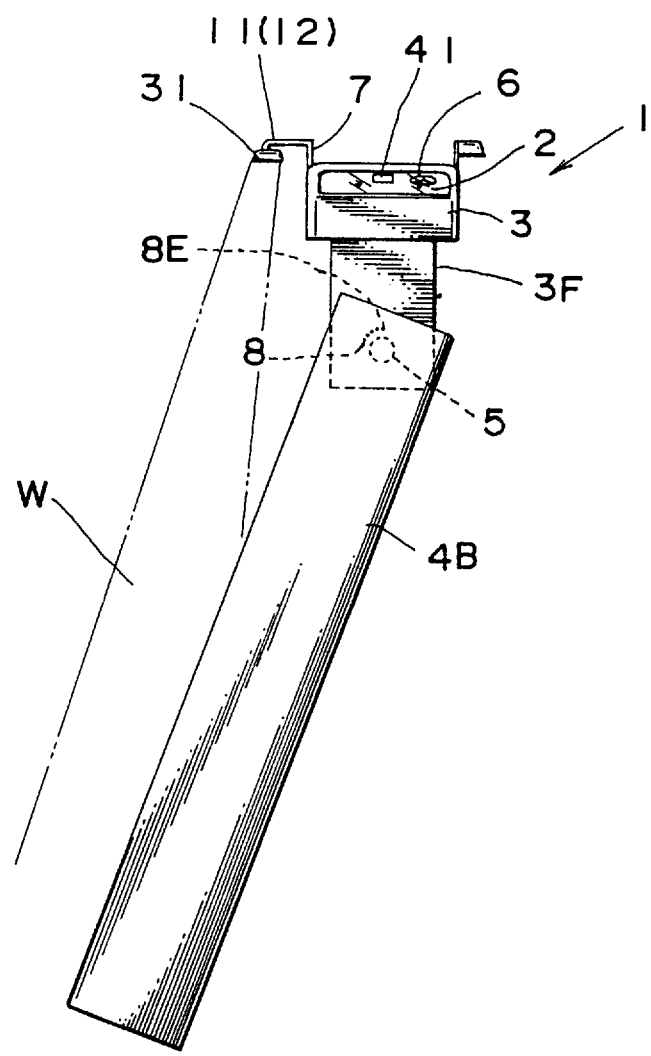
FIG. 11 is a plan view showing a coupled vehicle with a long trailer being coupled, having an outside mirror apparatus of a first embodiment of the invention.

Referring to FIG. 11 showing a trailer 4A twice as long as said trailer 4 coupled with the tractor 3, there is provided aforesaid trailer selection switch 47 particularly for use with such case. When the trailer selection switch 47 is turned on, the direction of the mirror surface 33A can be adjusted in order that the side of the back part of the trailer 4A may be visually confirmed even if the trailer 4A twice as long as said trailer 4 is coupled. In an illustrated example, each proximity sensor 8,8A,8B . . . outputs detection signal thereby directing the mirror surface 33A from the direction PS to the directions PA,PC,PE in sequence with the intermediate directions being skipped, based on an angle of bend between the tractor 3 and the trailer 4B, so that the direction of the mirror surface 33A can be controlled so as to visually confirm the side of the back part of the longer trailer 4B.

Hereinafter is described a method of actually using said outside mirror 31. Initially, a driver sitting on the driving seat 2 turns on said power switch 42 to operate said up-rotating switch 46U, down-rotating switch 46D, left-rotating switch 46L and right-rotating switch 46R so that the mirror surface 33A may be directed to a desired direction. When the coupled vehicle 1 moves back or forth while turning around, he can turn on the automated mode selection switch 43 to drive said mirror angle controller means 51. When the angle of bend "theta" between the tractor 3 and the trailer 4 varies by the operation of the handle 6 and reaches 15 degrees, the first proximity sensor 8 will detect the dog 9, whose detection signal will be input in the mirror angle controller means 51, which will control the mirror rotating means 34 to direct the mirror surface 33A to the aforesaid direction P. Subsequent every increase of the angle of bend "theta" by 15 degrees allows said sensors 8A,8B,8C,8D and 8E to output detection signals in sequence to vary by stages the direction of the mirror surface 33A to the aforesaid directions PA,PB,PC,PD and PE respectively, whereby the driver can obtain a proper rearview.

On the other hand, as the decrease of the angle of bend "theta" proceeds, the proximity sensors 8E,8D,8C,8B,8A and 8 in sequence will detect the dog 9 in the reverse manner, thereby varying by stages the direction of the mirror surface 33A to the aforesaid directions PE,PD,PC,PB,PA and P in sequence until no detection signal is input from the proximity sensor 8 when the mirror surface 33A is directed to the direction PS.

As above described, as the change of angle of bend by 15 degrees each permits the direction of the mirror surface 33A to vary by stages, the direction of the mirror surface 33A is held constant before the change of the angle of bend "theta" reaches 15 degrees, whereby a driver finds it easier to confirm the change of the direction of the back part of the trailer 4 owing to such constant direction of the mirror surface 33A. Further, as the angle of elevation of the mirror surface 33A is unchanged even if the automated mode selection switch 43 is turned on, a better rearview adjusted to the line of a driver's sight can be obtained. As mentioned above, when the automated mode selection switch 43 is turned off, the mirror surface 33A is returned to its home position by said storage means 48.

According to a first embodiment of the invention, as the vehicle angle detector means comprises a plurality of proximity sensors 8,8A,8B,8C,8D and 8E provided in the tractor 3, said sensors detecting the rotation of the frame 4 of the trailer 4 at said pivotable coupling 5 side, the angle of the mirror surface 33A can be adjusted so as to obtain a proper rearview with the use of these sensors 8,8A,8B,8C,8D and 8E. Further, as these sensors 8,8A,8B,8C,8D and 8E are each non-contact type sensors, they are advantageous in terms of durability. Additionally, as the sensors 8,8A,8B, 8C,8D and 8E are provided in the tractor 3, the component required to be mounted to the trailer 4 is the detecting dog 9 only, thus enabling the replacing works to be performed more easily. Specifically, the dog 9 to be detected by said sensors is provided on the frame 4 of the trailer 4 at said pivotable coupling 5 side while the sensors 8,8A,8B,8C,8D and 8E are diposed at predetermined angular intervals in the frame 3F of the tractor 3 at the pivotable coulping 5 side, corresponding to the rotational orbit of the dog 9, whereby each sensor can detect the displacement of the dog 9 in order to detect the angle of bend "theta", so that the direction of the mirror surface 33A can be easily controlled based on the detection results.

From another aspect of a first embodiment of the invention, as the mirror angle controller means 51 is capable of rotating the mirror surface 33A by stages, in other words, from one stage to another, on the basis of the detection signals from the proximity sensors 8,8A,8B,8C,8D and 8E, next detection by next sensor other than is actually detecting does not occur until the change of the angle of bend "theta" reaches predetermined angle, thus resulting in the mirror surface 33A being fixed during the period. Accordingly, a driver is capable of confirming the change of the direction of the back part of the trailer 4 more easily due to such temporarily constant direction of the mirror surface 33A. In other words, since the direction of the mirror surface 33A is held constant when fine tuning the angle of bend "theta" with the use of the handle 6, a driver can see an image of the trailer 4 in motion on the constantly directed mirror surface 33A, so that he finds it more easier to visually confirm the change of the direction of the trailer 4.

Furthermore, as there is provided the motor 15 for shifting the outside mirror 31 sidewise, the outside mirror 31 is made extensible thereby enabling the adjusting of an angle of visibility of the mirror surface 33A for obtaining an improved rearview.

In addition to the above described, a first embodiment of the invention is advantageous in that the set position storage means 48 serves to hold the upper/lower-facing directions of the mirror surface 33A constant even during the automated mode where the direction thereof is automatically changed by the said proximity sensors, so that a driver can obtain a better rear view corresponding to his line of sight. On the other hand, when the automated mode is switched off, the mirror surface 33A is automatically returned to its home position, so that there is no need to adjust the direction of the mirror surface 33A after using such automated mode. Further, the distal end of the detector rod 37 is adapted to abut upon the back surface of the mirror body 33, corresponding to the aforesaid virtual horizontal axis Ky, thus enabling the accurate measurement of the lateral directions of the mirror surface 33A. Furthermore, as the proximity sensors 8,8A,8B,8C,8D and 8E are a plurality of high frequency oscillation type or capacitance type sensors, they are excellent in durability as compared with other type sensors such as photoelectric sensor, so that a stable performance with less failures can be expected even for a coupled vehicle such as the tractor/trailer 1 that requires relatively strict using conditions. Additionally, owing to the aforesaid trailer selection switch 47, the mirror angle controller means 51 is actuated in order that the mirror surface 33A may be directed to proper positions where the back part of the lengthy trailer 4B can be visually confirmed, whereby an excellent rearview can be obtained with such lengthy trailer 4 being coupled.

In FIG. 12 showing a second embodiment of the invention, the same portions as those described in a first embodiment will be designated as the same numerals, and their repeated detailed description will be omitted.

In a second embodiment, there is proposed another example of the shifting mechanism K which comprises a mounting frame 11A attached to said stay 7, a fixed support rod 61 which is pipe-shaped, extending sidewise from said mounting frame 11A, a pipe-shaped extensible support rod 62 to be slidably inserted into said support rod 61, a distal extensible support rod 63 to be also slidably inserted into said rod 62, said distal rod 63 securely attaching said outside mirror 31 to its distal end. Incidentally, there are provided stoppers (not shown) at the respective proximal sides of the extensible support rods 62 and 63. To the proximal end of the extensible support rod 63 is connected a distal end of a driving cable 64 such as push-and-pull cable having a predetermined strength and flexibility, whereby the proximal end of the extensible support rod 64 is drawn by a reel 65 provided inside said mounting frame 11A by means of a motor 66 with reduction gears, said motor 66 being reversibly rotated. Following such winding action, the aforesaid support rods 62 and 63 are adapted to be retreated, while they are extended by pushing said driving cable 64 out along a certain guide (not shown) from said reel 65 by means of the reverse rotation of said motor 66. In this embodiment also, said reel 65 is provided with aforesaid retreated position detector sensor 20 and advanced position detector sensor 21, thereby enabling the mirror position controller means 53 to control the motor 66 so that the outside mirror 31 may stop at either the advanced position or the retreated position by means of the detection signals from the sensors 20 and 21.

Figure 12A:
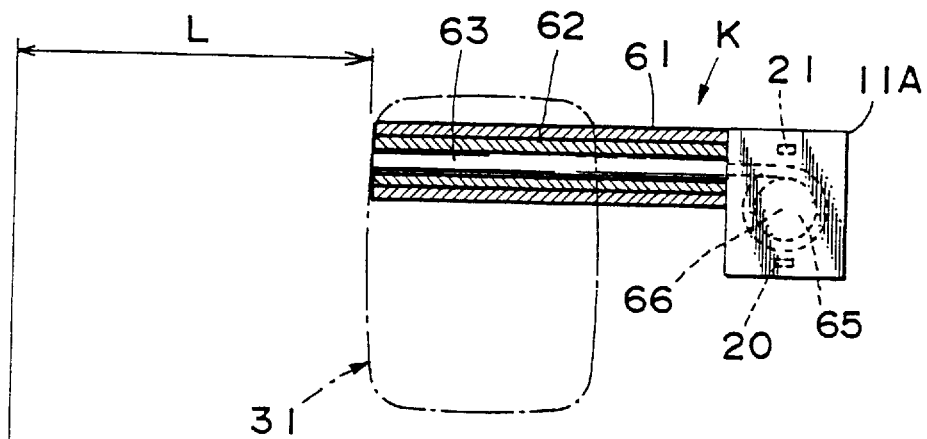
FIG. 12(A) illustrates the apparatus in a retreated position, while FIG. 12(B) in an advanced position.
Figure 12B:
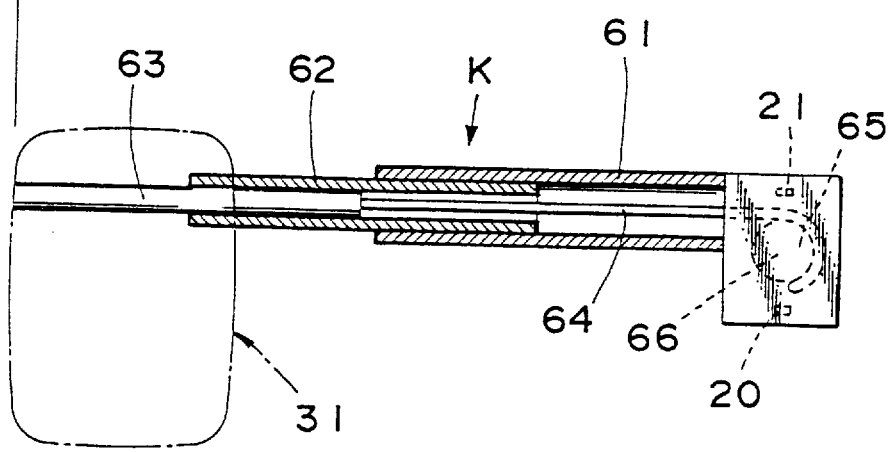

Describing in more detail, when said advancing switch 44 is turned on, the driving cable 64 is pushed out to shift the outside mirror 31 sidewise a distance defined by length L until it reaches the advanced position as illsutrated in FIG. 12(B), when the motor 66 is stopped due to the detection by said advanced position detector sensor 21. Likewise, when said retreating switch 45 is turned on, the driving cable 64 is wound until it reaches the retreated position as illustrated in FIG. 12(A), when the motor 66 is stopped due to the detection by said retreated position detector sensor 20.

According to a second embodiment of the invention, the extensible support rods 62 and 63 are extended or contracted with the motor 66, thereby housing the rods 62 and 63 into said fixed support rod 61 when contracted finally. As a result, the extended lengths of the rods can be suppressed at the same time the mounting frame 11A can be small-sized, thus making a so-called blind spot caused by said frame 11A smaller.

Figure 13:
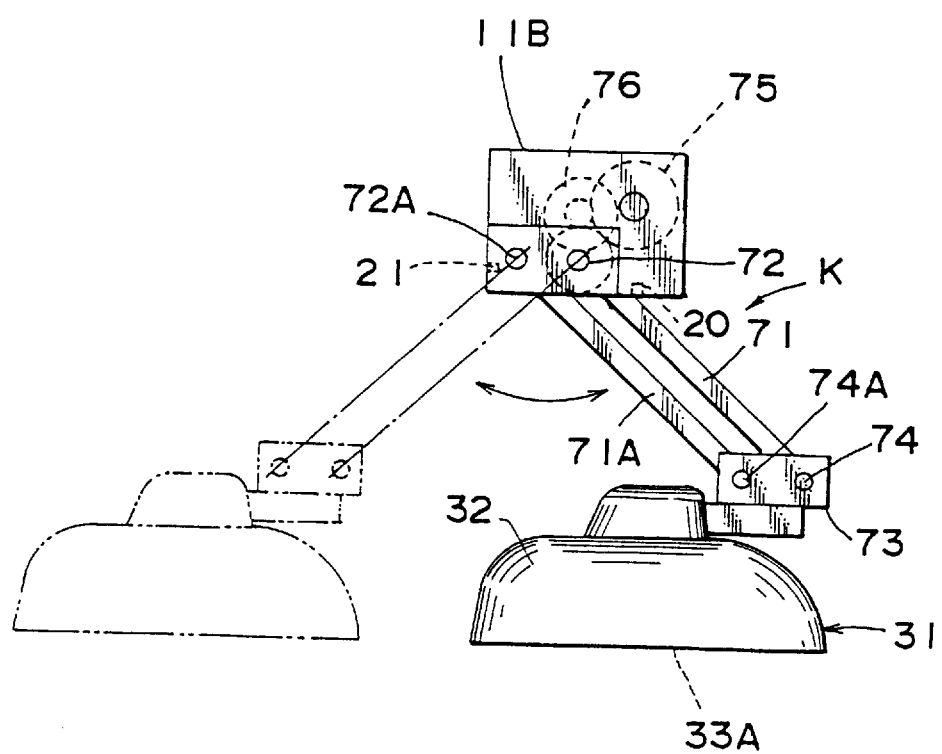
FIG. 13 is a plan view showing an outside mirror apparatus of a third embodiment of the invention.

Referring to FIG. 13 showing a third embodiment of the invention, the same portions as those described in the foregoing embodiments are designated as common reference numerals, and thus their detailed explanation will be omitted. In a third embodiment, there is further proposed another example of the shifting mechanism K which comprises a mounting frame 11B attached to said stay 7, a pair of parallel linking arms 71,71A connected to said frame 11B, having their proximal ends rotatably connected through the respective shafts 72 and 72A, a connector 73 provided at the rear surface of said cover body 32, having shafts 74 and 74A through which the distal ends of said linking arms 71 71A are rotatably connected to said connector 73 and a motor 75 mounted inside said mounting frame 11B, whose rotation is transmitted by gears 76 to said shaft 72, said shaft 72 being fixed to said parallel arm 71 but rotatable relative to said mounting frame 11B. Like the foregoing embodiment, the mounting frame 11B is provided with the advanced position detector sensor 21 and the retreated position detector sensor 20.

When said advancing switch 44 is turned on, the rotation of said motor 75 is transmitted via the gears 76 to said shaft 72 thereby rotating said parallel linking arms 71 and 71A to shift said outside mirror 31 outwardly or sidewise, which is then detected by said advanced position detector sensor 21 to stop the mirror 31. Likewise, when said retreating switch 45 is turned on, the motor 75 is reversely rotated, thus retreating the outside mirror 31, which is followed by the detection of the retreated position detector sensor 20 to stop the motor 75. Alternatively, these advancing or retreating switches 44,45 may continuously actuate said motor 75 as long as they are being pressed, thus enabling said outside mirror 31 to stop in an optional position between said two detection sensors 20 and 21.

According to a third embodiment of the invention, said parallel linking arms 71 and 71A are rotated to advance or retreat said outside mirror 31, whereby when said outside mirror 31 is completely retreated, there will be no portions extending sidewise any longer, thus attaining the same effect and action as described in the foregoing second embodiment. Further, a third embodiment is advantageous in that the direction of the mirror surface 33A will not be changed even after the parallel arms 71 and 71A are rotated.

Figure 14:
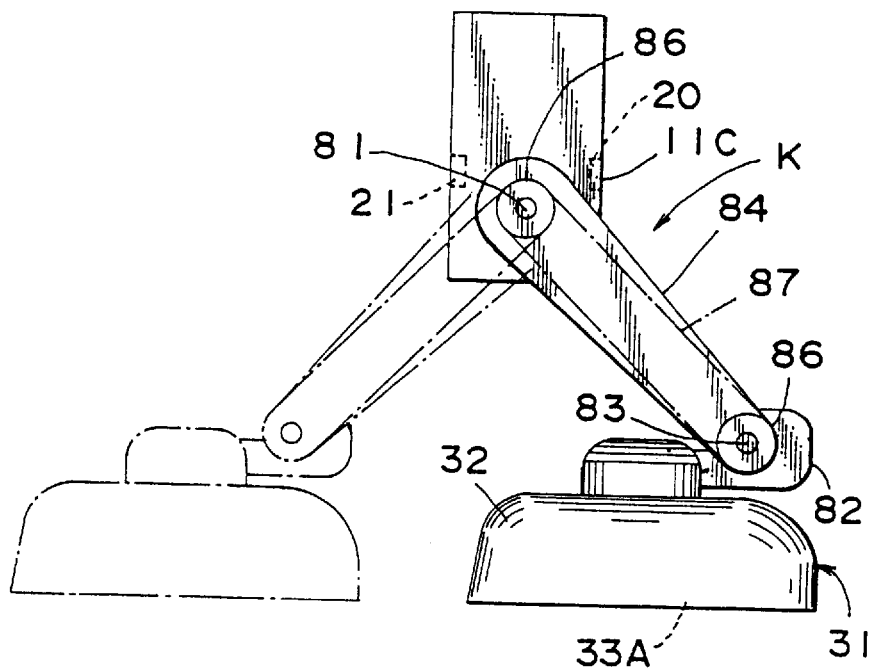
FIG. 14 is a plan view showing an outside mirror apparatus of a fourth embodiment of the invention.
Figure 15:
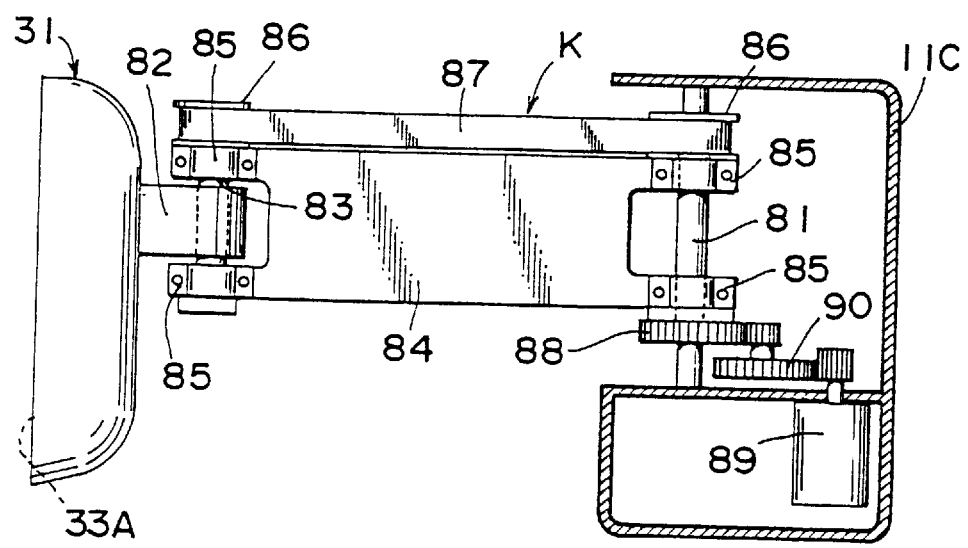
FIG. 15 is a profile showing an outside mirror apparatus of a fourth embodiment of the invention.

Referring to FIGS. 14 to 15 showing a fourth embodiment of the invention, the same portions as those described in the foregoing embodiments are designated as common reference numerals, and thus their detailed explanation will be omitted. In a fourth embodiment, there is further proposed another example of the shifting mechanism K which comprises a mounting frame 11C attached to said stay 7, a fixed shaft 81 vertically provided inside said frame 11C, a connector 82 provided at the rear surface of said cover body 32, having vertical axis 83 fixed thereto, a rotatable arm 84 for connecting said fixed shaft 81 to said vertical axis 83, said arm 84 having bearings 85 at the upper and lower parts of its both sides, each of which allows said fixed shaft 81 and vertical axis 83 to be rotatably inserted thereinto while being anchored by certain stoppers. To the upper parts of said fixed shaft 81 and veritical axis 83 are secured pulleys 86 respectively, each having the same number of tooth, and between said pulleys 86 is provided a belt 87 with tooth. To the lower part of said fixed shaft 81 is rotatably A provided a gear 88, which is fixed to said rotatable arm 84, thus transmitting the rotation of a motor 89 via gears 90 to said gear 88.

When said advancing switch 44 is turned on, the rotation of said motor 89 is transmitted via the gears 90 to said gear 88 thereby rotating said rotatable arm 84 to shift said outside mirror 31 outwardly or sidewise, which is then detected by said advanced position detector sensor 21 to stop the mirror 31. Likewise, when said retreating switch 45 is turned on, the motor 89 is reversely rotated, thus retreating the outside mirror 31, which is followed by the detection of the retreated position detector sensor 20 to stop the motor 89. In this case, as the fixed shaft 81 and the vertical axis 83 are each provided with pulley 86 with tooth, having said belt 87 and its tooth suspended therebetween, the mirror surface 33A is adapted to be shifted parallelly.

Alternatively, these advancing or retreating switches 44,45 may continuously actuate said motor 89 as long as they are being pressed, thus enabling said outside mirror 31 to stop in an optional position between said two detection sensors 20 and 21.

According to a fourth embodiment of the invention, said rotatable arm 84 is rotated by said motor 89 to advance or retreat said outside mirror 31, whereby when said outside mirror 31 is completely retreated, there will be no portions extending sidewise any longer, thus attaining the same effect and action as described in the foregoing embodiments. Further, a fourth embodiment is advantageous in that as the belt 87 having tooth is suspended between the two pulleys 86 having the same number of tooth, the mirror surface 33A is adapted to be shifted parallelly even after rotating said rotatable arm 84.

Figure 16:
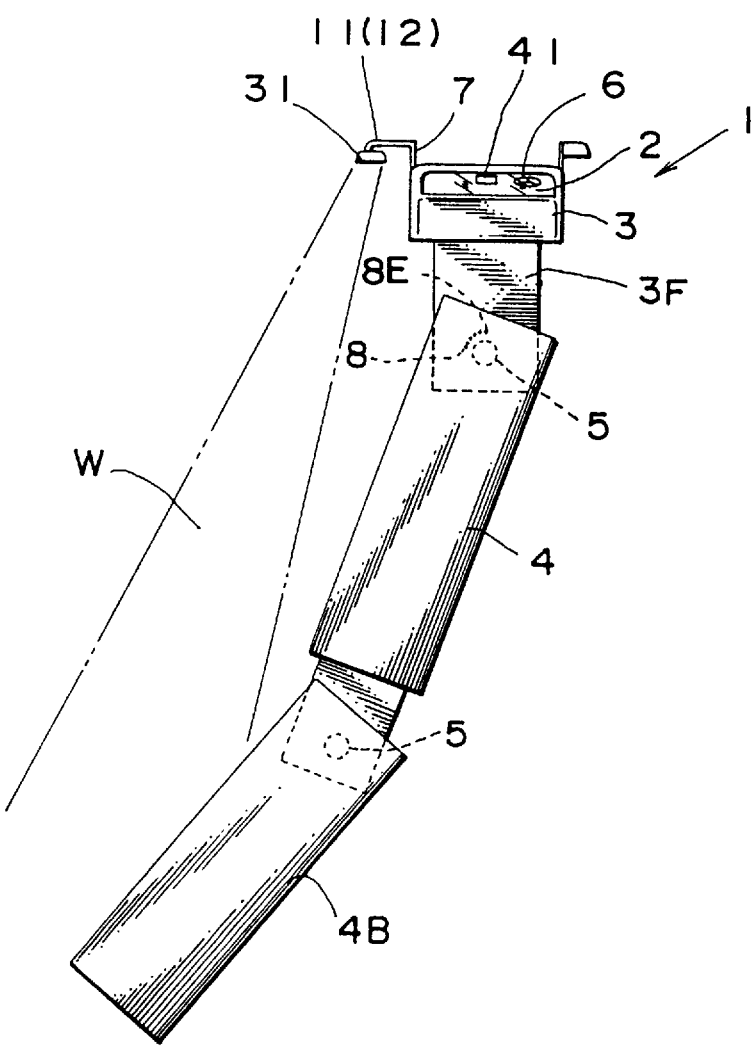
FIG. 16 is a plan view showing an outside mirror apparatus of a fifth embodiment of the invention, in which two trailers are coupled with a tractor.

Referring to FIG. 16 showing a fifth embodiment of the invention, the same portions as those described in the foregoing embodiments are designated as common reference numerals, and thus their detailed explanation will be omitted. In a fifth embodiment, there is proposed another example of the trailer selection switch 47 that is used for a case where two trailers 4 and 4B are coupled with the tractor 3, as illustrated in FIG. 16. When the trailer selection switch 47 is turned on, the direction of the mirror surface 33A is adjusted to a position where a side area W of the back part of the trailer 4B can be visuallly confirmed. For example, in the case that the front trailer 4 has the same length as the back trailer 4B, the detection signals 8,8A,8B in sequence can change the direction of the mirror surface 33A from the initial direction PS to the aforesaid direction PA,PC,PE in sequence with the respective intermediate directions being skipped, whereby the direction of the mirror surface 33A can be controlled so that the side area W of the back part of the trailer 4B may be visually confirmed based on the detected angle of bend "theta" between the tractor 3 and the trailer 4.

Incidentally, the present invention should not be limited to the foregoing embodiments, but may be modified within a technical scope of the invention. For example, the shifting means may be other than the motors, which may be other suitable means such as cylinder. Further, other shifting mechanism may be suitably chozen. Furthermore, in the structures as defined by claims 1 through 3, the position of the outside mirror may be manually changed relative to the rail extending laterally from the stay 7. Additionally, the mirror rotating means should not be limited to those of the embodiments and the mirror body 33 may be convex mirror. In the case that a coupled vehicle has a left handle, the outside mirror 31 may be provided at the right side. In addition, although the foregoing embodiments of the invention proposed to dispose the proximity sensors at 15 degrees angular intervals, they may be disposed within a range of 5 to 30 degrees intervals, more preferably 10 to 20 degrees.

What is claimed is:

1. An outside mirror apparatus for a coupled vehicle having a tractor removably connected to a trailer via a pivotable coupling, comprising:

an outside mirror mounted to said tractor, said outside mirror having a mirror body, a mirror surface provided at a front surface of said mirror body, and a mirror angle detection means for detection of a plane angle of said mirror surface, said mirror angle detection means comprising a detector rod having its distal end abutted upon a rear surface of said mirror body, and a potentiometer for detection of a position of said detector rod;

a mirror rotating means for rotating said outside mirror around a vertical axis thereof;

a tractor angle detector comprising a plurality of proximity sensors provided in said tractor for detecting an angle of bend between said tractor and said trailer, said plurality of sensors disposed at preset angular intervals in said tractor adjacent said pivotable coupling, said sensors capable of detecting a rotation of said trailer around said pivotable coupling;

an object to be detected by said proximity sensors, said object situated in said trailer adjacent said pivotable coupling; and a mirror angle controller means for controlling an angle of said mirror based on the angle of bend detected by said tractor angle detector so that a proper rear view can be obtained, said mirror angle controller means rotating said surface of said outside mirror by stages by means of detection signals from said plurality of proximity sensors.

2. An outside mirror apparatus for a coupled vehicle according to claim 1, wherein said mirror rotating means further functions to rotate said mirror body around a virtual horizontal axis, while a distal end of said detector rod is abutted upon a rear surface of said mirror body so as to correspond to a position of said virtual horizontal axis.

3. An outside mirror apparatus for a coupled vehicle having a tractor removably connected to a trailer via a pivotable coupling, comprising:

an outside mirror mounted to said tractor, said outside mirror having a mirror body and a mirror surface provided at a front surface of said mirror body;

a shifting means for shifting said outside mirror sidewise, said shifting means comprising a slide guiding rail extending horizontally, a slide block provided for mounting said outside mirror thereto, said slide block being movable along said slide guiding rail, driving and driven pulleys disposed at both ends of said slide guiding rail, a driving belt suspended between said pulleys, said belt having teeth, a fixture for fixing said slide block to said driving belt and a motor for rotating said driving pulley;

a mirror rotating means for rotating said outside mirror around a vertical axis thereof;

a tractor angle detector comprising a plurality of proximity sensors provided in said tractor for detecting an angle of bend between said tractor and said trailer, said plurality of sensors disposed at preset angular intervals in said tractor adjacent said pivotable coupling, said sensors capable of detecting a rotation of said trailer around said pivotable coupling;

an object to be detected by said proximity sensors, said object situated in said trailer adjacent said pivotable coupling; and a mirror angle controller means for controlling an angle of said the or based on the angle of bend detected by said tractor angle detector so that a proper rear view can be obtained, said mirror angle controller means rotating said surface of said outside mirror by stages by means of detection signals from said plurality of proximity sensors.

4. An outside mirror apparatus for a coupled vehicle according to claim 3, further comprising position detector sensors provided at both ends of said slide guiding rail for detection of a position of said slide block, said position detector sensors being able to output detection signals for stoppage of said motor.

* * * * *

UNITED STATES PATENT AND TRADEMARK OFFICE
CERTIFICATE OF CORRECTION

PATENT NO. : 5,835,291
DATED : November 10, 1998
INVENTOR(S) : Hidenori Takayama It is certified that error appears in the above-identified patent and that said Letters Patent is hereby corrected as shown below:

Column 9, line 35, delete the "A" between the words "rotatably" and "provided".

Column 12, line 14, delete the words "the or" and insert therefor --mirror--.

Signed and Sealed this

Twenty-eighth Day of September, 1999

Attest:

Q. TODD DICKINSON

Attesting Officer

Acting Commissioner of Patents and Trademarks